Patented Mar. 16, 1943

2,314,196

UNITED STATES PATENT OFFICE 2,314,196

DIAZO COMPOSITION

Earl W. Clark, Buffalo, N. Y., assignor to Allied Chemical & Dye Corporation, a corporation of New York No Drawing. Application July 27, 1940, Serial No. 348,023

11 Claims. (Cl. 8—44)

This invention relates to the production of stable diazo compositions. It relates more particularly to improvements in the production of stabilized diazo compositions containing a diazo derivative of 4-chlor-2-nitraniline.

The diazo compounds of 4-chlor-2-nitraniline (for example, 4-chlor-2-nitro-benzene diazonium chloride) are valuable intermediate compounds for the production of azo dyes; but owing to their instability, the diazonium salts are not sold commercially as such. For marketing, the diazonium salts are converted to diazo compositions, which are preferably dry solids, in which the diazotized 4-chlor-2-nitraniline is in the form of a double or mixed double salt of the diazonium compound and one or more salts of a heavy metal (as for example, a halide, such as the chloride of zinc, tin, mercury, cadmium, cobalt, etc.) or in the form of a salt of the diazonium compound and one or more aromatic sulfonic acids or metal salts thereof (as for example, 1.5-naphthalene disulfonic acid, alpha- or beta-naphthalene sulfonic acid, benzene monosulfonic acid, 1,2,4-chlorbenzene disulfonic acid) or in the form of a complex, mixed or simple salt of the diazonium compound and one or more inorganic acids (as for example, borofluoric acid, fluorosulfonic acid, sulfuric acid, etc.). Further, with a view to enhancing the stability and keeping qualities of such diazo salts and mixed products, as well as their solubility in water, dye baths, printing pastes, and the like, such compositions also frequently include partially hydrated magnesium sulfate, alums, crystallized aluminum sulfate, sodium sulfate, aromatic sulfonic acids, and related substances.

While the stability of the resulting diazo compositions is improved as compared with that of the diazonium salt, e. g., 4-chlor-2-nitrozenzene diazonium chloride in aqueous solution, such compositions frequently decompose upon standing even at ordinary temperatures. This decomposition or deterioration is reflected in the decrease in the strength and shade of the prints which are obtained by printing an aqueous paste, prepared from such compositions, upon fabric grounded with a coupling component and then developing the color in the well known manner, as compared with prints obtained from freshly prepared diazotized 4-chlor-2-nitraniline. Further, even when such dry compositions which have been freshly prepared, so that there has been no substantial decomposition in the solid form, are made into aqueous solutions or suspensions, they lose much of their strength within a few hours.

According to the present invention sulfamic acid ($H_2N.SO_3H$) and its salts are employed to stabilize the diazo derivatives of 4-chlor-2-nitraniline, whether as such or in the form of diazo compositions containing them. Thus, the addition of sulfamic acid or salts thereof, such as, for example, the sulfamates of ammonium, sodium, potassium, magnesium, barium, zinc, cobalt, cadmium, etc., to diazotized 4-chlor-2-nitraniline improves the stability of the latter both in the dry form and in the form of aqueous compositions. The present invention is particularly applicable to increase the stability of diazo compositions containing a diazo derivative of 4-chlor-2-nitraniline in the form of one or more of said salts and/or mixed products, which diazo compositions hereinafter will be referred to as "Fast Red 3G Salts."

Dry technical Fast Red 3G Salts containing sulfamic acid or a salt thereof as a stabilizer, in accordance with the present invention, may be stored at ordinary temperatures for extended periods of time with less impairment of their dyeing qualities than would result in the absence of sulfamic acid or its salts. Aqueous printing paste compositions prepared from such improved Fast Red 3G Salts deteriorate to a lesser degree upon standing at room temperature. This is of particular advantage to the printer, for he may postpone the application of the printing paste to the grounded fabric without great risk of obtaining inferior prints. The use of this invention thus permits much greater flexibility, economy and control in dyeing and printing with Fast Red 3G Salts.

The incorporation of sulfamic acid or salt of sulfamic acid with the diazotized 4-chlor-2-nitraniline may be carried out at any stage of the preparation of the diazo composition. Thus, sulfamic acid or a salt thereof is preferably mixed with a Fast Red 3G Salt in the dry form, or it may be mixed with a moist filter cake of the diazo composition resulting from precipitation thereof from the reaction mixture in which it was prepared followed by filtration, and the mixture then dried. In order to secure maximum protection against deterioration of the diazo composition, sulfamic acid or a salt thereof is incorporated with the diazo composition preferably as soon as possible following the preparation of the diazo composition.

The following examples illustrate the invention. The parts are by weight.

EXAMPLE 1

(A) 4-chlor-2-nitraniline is diazotized with sodium nitrite in a suitable acid medium such as hydrochloric acid; zinc chloride is added to the reaction mixture; and a double salt of 4-chlor-2-nitro-benzene diazonium chloride and zinc chloride is precipitated, the temperature being maintained throughout at about 0° to about 10° C. The precipitate is filtered off from the mother liquor, the resulting moist filter cake is stirred with hydrous potash alum and sufficient anhydrous magnesium sulfate to take up all of the water in the moist filter cake as chemically combined water of hydration. There is thus produced a dry homogeneous mixture containing the mixed chlorides of zinc and the diazonium compound, together with magnesium sulfate and potash alum. The product is a dry solid which in the form of a powder constitutes a commercial form of Fast Red 3G Salt. It contains an amount of diazonium compound corresponding approximately to 22.2 parts of 4-chlor-2-nitraniline per 100 parts of Fast Red 3G Salt.

(B) 11 parts of crystalline sulfamic acid are ground together with 100 parts of the dry Fast Red 3G Salt produced in (A) above to form a homogeneous powder.

(C) A printing paste of uniform composition is prepared by mixing 3.6 parts of the powder obtained in (A) above, 32 parts of water, and 64 parts of starch-tragacanth thickening (obtained by slurrying 70 parts of wheat starch in 430 parts of water, stirring in 500 parts of a 6 per cent aqueous solution of gum tragacanth, boiling the resultant mixture until free from lumps and finally adjusting the mass to 1000 parts by addition of water). A similar printing paste is prepared from 4 parts of the powder obtained in (B) above. The resulting printing pastes are divided into portions. One portion of each is immediately printed upon cotton fabric prepared with a ground of Naphthol AS (the anilide of 2,3-hydroxy naphthoic acid). The printed fabric is then dried, washed, soaped and finished in the usual manner to develop the color. The resultant prints are equal in brightness and strength. Another portion of each printing paste is allowed to stand at room temperature for about four and one-half hours and is then printed and developed as described above. The print obtained with the paste made with the powder of (B) above, is very appreciably brighter and stronger than the one which is obtained with the printing paste prepared from the powder of (A) above.

(D) The dry diazo salt composition prepared in (A) above, and the stabilized, dry diazo salt composition prepared in (B) above are allowed to stand at room temperature for about three months. Each diazo salt composition is thereafter converted into a printing paste in the manner described in (C). One portion of each resultant paste is printed immediately upon cotton fabric grounded with Naphthol AS and finished in the manner described above. The print obtained with the printing paste prepared from the three-month old powder of (B) is somewhat brighter and stronger than the print which is obtained with the printing paste prepared from the three-month old powder of (A). Another portion of each printing paste is allowed to stand at room temperature for about 3 hours and is then printed and developed in the manner described above. The print obtained with the printing paste from the powder of (B) is much stronger and brighter than the print which is obtained with the printing paste from the powder of (A).

EXAMPLE 2

(A) 4.0 parts of a dry commercial Fast Red 3G Salt of the type produced in Example 1(A), having a strength corresponding to approximately 20 per cent of 4-chlor-2-nitraniline (i. e., containing an amount of diazotized 4-chlor-2-nitraniline corresponding with 20 parts of 4-chlor-2-nitraniline per 100 parts of Fast Red 3G Salt), 0.4 part of crystalline sulfamic acid, 31.6 parts of water, and 64.0 parts of starch-tragacanth thickening (prepared as described in Example 1(C) above) are stirred together to form a printing paste of uniform compositon.

(B) A similar printing paste is prepared using 32 parts of water and omitting the sulfamic acid.

Equal portions of the resulting printing pastes are immediately printed upon cotton fabric prepared with a Naphthol AS ground and the printed fabric is dried, washed, soaped and finished in the usual manner to develop the color. The prints thus obtained are equal in strength, shade and brightness.

Other portions of the printing pastes are allowed to stand at room temperature for about three hours and are then printed as described above. The resultant print obtained from the printing paste of (A), which contains sulfamic acid, is much stronger and brighter than the print which is obtained in like manner from the printing paste of (B), which contains no sulfamic acid.

EXAMPLE 3

A uniform printing paste was prepared by mixing 5 parts of Fast Red 3G Salt, which was obtained in the manner described in Example 1(A) and contained an amount of diazotized 4-chlor-2-nitraniline corresponding to 1 part of 4-chlor-2-nitraniline, with 0.5 part of crystalline sulfamic acid, 48 parts of water and 74.5 parts of starch-tragacanth thickening (obtained as described in Example 1(C) above).

Several printing pastes were prepared similarly by employing in each case a chemically equivalent weight of a salt of sulfamic acid in place of 0.5 part of sulfamic acid, and mixing the said salt with 5 parts of Fast Red 3G Salt, 48 parts of water and sufficient starch-tragacanth thickening to make a total of 128 parts.

Another similar printing paste was prepared as a control by omitting the sulfamic acid and salts thereof, and using 5 parts of Fast Red 3G Salt, 48 parts of water, and 75 parts of starch-tragacanth thickening.

The printing pastes thus prepared were then compared for stability in the following manner.

From each paste six equal portions were separated each having the same chosen weight. Each of three of these portions was diluted with its own weight of starch-tragacanth thickening. In this manner, three series of undiluted pastes in which all pastes weighed alike and three series of diluted pastes in which all pastes weighed alike were obtained, and each of the pastes in all the series contained the same amount of Fast Red 3G Salt.

One series of the undiluted pastes (A) and one series of the diluted pastes (B) were used for printing within one hour after preparation. Another series of undiluted pastes (C) and one of diluted pastes (D) were allowed to stand at about 15° to 20° C. for about three hours after preparation, before they were used for printing. The third, remaining series of undiluted (E) and diluted (F) pastes were stored at about 15° to 20° C. for 20 hours before they were used for printing. In all cases, the pastes were printed on cotton fabric prepared with a ground of Naphthol AS. The printed fabric was dried, washed, soaped and finished in the same (usual) manner to develop the color.

In the following table, the nature and amount of stabilizing agent employed in each printing paste is shown, as well as data characterizing the resulting prints. By comparison of the data it is readily seen that a printing paste containing sulfamic acid, or one of the stated salts of sulfamic acid, is more stable than a similar paste containing none of these substances; and that a printing paste containing sulfamic acid is more stable than a similar paste which contains a chemically equivalent weight of a tested sulfamic acid salt.

parts of sodium sulfamate are ground together with 100 parts of the dry Fast Red 3G Salt produced as described in Example 1(A). A homogeneous powder of similar properties to that of Example 4 is obtained.

It will be evident to those skilled in the art that the invention is not limited to the details of the above examples nor to the ingredients, proportions, order of steps, and the like. The Table

| Printing paste (No.) | Stabilizing agent | Amt. of stabilizing agent (parts) | Original paste (printed within 1 hour) | | Printed after 3 hours standing | | Printed after 20 hours standing | |
|---|---|---|---|---|---|---|---|---|
| | | | Undiluted A | Diluted B | Undiluted C | Diluted D | Undiluted E | Diluted F |
| 1 | None | None | | | Only about 30% as strong as print obtained from corresponding original paste. | Very slight coloration. | Practically no coloration. | No coloration. |

COMPARISON OF PRINTS WITH PRINTS FROM SAME SERIES OF NO. 1

| | | | | | | | | |
|---|---|---|---|---|---|---|---|---|
| 2 | Sulfamic acid | 0.5 | Appreciably stronger and brighter; equal in shade. | Appreciably stronger; substantially equal in shade and brightness. | Very much stronger; good shade and brightness. | Very much stronger; good shade and brightness. | Very much stronger; (about 50 to 60—as strong as print from corresponding original paste No. 2A). | About 10 to 20% as strong as print from corresponding original paste No. 2B. |
| 3 | Sodium sulfamate [1] $H_2NSO_3Na$. | 0.613 | Substantially equal in strength; shade and brightness. | Slightly weaker; substantially equal in shade and brightness. | Considerably stronger; good shade and brightness.[2] | Appreciably stronger; good shade and brightness. | Considerably stronger; (about 25 to 30% as strong as print from corresponding original paste). | Slight coloration. |
| 4 | Potassium sulfamate [1]. $H_2NSO_3K$. | 0.696 | ...do... | Very slightly weaker; substantially equal in shade and brightness. | Appreciably stronger; good shade and brightness. | Appreciably to considerably stronger; good shade and brightness. | ...do... | Appreciable coloration. |
| 5 | Magnesium sulfamate [1] $(H_2NSO_3)_2Mg$. | 0.557 | ...do... | Substantially equal in strength, shade and brightness. | ...do... | ...do... | ...do... | Do. |
| 6 | Barium sulfamate [1] $(H_2NSO_3)_2Ba$. | 0.848 | ...do... | Very slightly weaker; substantially equal in shade and brightness. | ...do... | Appreciably stronger; good shade and brightness. | ...do... | Slight to appreciable coloration. |
| 7 | Zinc sulfamate [1] $(H_2NSO_3)_2Zn$. | 0.663 | Slightly weaker; substantially equal in shade and brightness. | Very slightly weaker; substantially equal in shade and brightness. | Appreciably stronger; good shade and brightness. | Slightly to appreciably stronger. | Appreciably stronger. | Very slight coloration. |
| 8 | Cobaltous sulfamate [1] $(H_2NSO_3)_2Co$. | 0.646 | Substantially equal in strength, much duller and appreciably bluer. | Slightly weaker, bluer and duller. | Appreciably stronger; appreciably duller than prints from Nos. 2 to 7, inc., and 9. | Slightly stronger; appreciably duller than prints from Nos. 2 to 7, inc., and 9. | Slightly to appreciably stronger. | No coloration. |
| 9 | Cadmium sulfamate [1] $(H_2NSO_3)_2Cd$. | 0.786 | Substantially equal in strength, shade, and brightness. | Slightly stronger; substantially equal in shade and brightness. | Appreciably to considerably stronger. | Appreciably stronger. | Appreciably stronger. | Slight to appreciable coloration. |

[1] The metal salts of sulfamic acid were obtained in substantially anhydrous form by reacting metathetically in aqueous solution sulfamic acid and the hydroxide or carbonate of the metal and evaporating the resulting solution to dryness on an atmospheric drum drier employing 40# steam pressure within the drum.
[2] Nos. 3, 4, 5, 6, 7, and 9 are about equal in shade and brightness.

EXAMPLE 4

17.7 parts of sodium sulfamate ($H_2NSO_3Na$) are ground together with 100 parts of dry Fast Red 3G Salt produced as described in Example 1(A). A homogeneous powder is obtained having improved stability similar to that of Example 1.

EXAMPLE 5

5.9 parts of crystalline sulfamic acid and 11.8 scope of the invention is indicated in the appended claims.

Thus the amount of sulfamic acid or salt thereof which may be employed according to the present invention to stabilize the diazo derivatives of 4-chlor-2-nitraniline may be varied. In general, sulfamic acid exerts a more powerful stabilizing influence on Fast Red 3G Salt than a chemically equivalent weight of one of its salts.

For the stabilization of Fast Red 3G Salts, and particularly those containing a heavy metal chloride with sulfamic acid, amounts of sulfamic acid are preferably employed which are equal to from 2.5 to 15 per cent by weight of standardized diazo composition of about 20 per cent base strength (amounts of sulfamic acid by weight corresponding with one-eighth to three-fourths of the weight of the 4-chlor-2-nitraniline equivalent of the diazo derivative) have been found satisfactorily effective for commercial purposes. Within this range, the stabilizing effect of sulfamic acid upon the diazo composition reaches a maximum at about 10 per cent of the weight of standardized diazo composition of about 20 per cent base strength (a weight of sulfamic acid corresponding to about one-half of the weight of the 4-chlor-2-nitraniline equivalent of the diazo derivative), and decreases uniformly in such a manner that the effect at about 15 per cent is nearly the same as at about 2.5 per cent. Amounts of sulfamic acid outside the range from about 2.5 per cent to about 15 per cent (based upon the weight of standardized diazo composition of about 20 per cent base strength) are much less effective in stabilizing Fast Red 3G Salts than the amounts of sulfamic acid within the preferred range. As is customary in the art, proportions of ingredients with relation to the diazotized 4-chlor-2-nitraniline are expressed in terms of the equivalent weight of the free base, 4-chlor-2-nitraniline.

The incorporation of sulfamic acid, particularly in the concentrations normally employed for stabilization, with Fast Red 3G Salt compositions considerably increases the acidity of these compositions. Per se this increased acidity of such compositions does not usually cause difficulties in conventional printing processes; but in development dyeing processes wherein a fabric grounded with a coupling component (e. g., Naphthol AS) is subjected to the action of an aqueous solution of Fast Red 3G Salt, it may militate against the use of such compositions, particularly when they contain additional conventional adjuvants of acid reaction (e. g., potash alum, etc.). Thus, in dyeing according to some trade practices, the amount of alkali incorporated with the grounded fabric may be insufficient to neutralize the acidity due to sulfamic acid, and thereby coupling of diazo component with coupling component may be hindered to an extent such that the dyeing may be of inferior strength. The use of relatively non-acid salts of sulfamic acid in place of sulfamic acid obviates these difficulties and is particularly advantageous for the preparation of Fast Red 3G Salt compositions suitable generally for dyeing as well as printing. While salts of sulfamic acid are less powerful stabilizing agents than a chemically equivalent weight of sulfamic acid for Fast Red 3G Salts, the degree of stabilization of such Fast Red 3G Salt which is effected by salts of sulfamic acid can be generally increased by increasing the amount of the latter with respect to the amount of Fast Red 3G Salt. In Example 4, the weight of sodium sulfamate is about one and one-half times the weight of sulfamic acid used in Example 1.

The sulfamic acid or its salts may be present in the dry and/or aqueous diazo compositions of the present invention along with one or more other ingredients which are often present in the commercial forms of diazo compositions containing diazo derivatives of 4-chlor-2-nitraniline and/or which are added to the relatively pure diazo salts to improve their behavior in dyeing; such as, for example, neutral salts (e. g., sodium chloride, sodium sulfate, potassium chloride, sodium di-isopropylnaphthalene sulfonate, sodium octyl sulfo acetate, etc.), salts of acid reaction (e. g., sodium bisulfate, potassium aluminum sulfate, acid potassium oxalate, aluminum sulfate, etc.), and acids (e. g., hydrochloric, acetic, aromatic sulfonic acids, etc.). Further, mixture of sulfamic acid and one or more of its salts, or mixtures of its salts may be similarly employed.

In preparing printing pastes from the improved dry diazo compositions in accordance with the present invention, the compositions may be slurried with water and then mixed with the desired amount of thickening agent and/or other ingredients; as for example, gum tragacanth, dextrin, dynamite glycerin, etc.

I claim:

1. A diazo composition comprising diazotized 4-chlor-2-nitraniline and at least one of the group consisting of sulfamic acid and its salts, as a stabilizing agent therefor.

2. A diazo composition comprising diazotized 4-chlor-2-nitraniline in combination with a metal halide, and at least one of the group consisting of sulfamic acid and its salts, as a stabilizing agent therefor.

3. A diazo composition comprising a diazo derivative of 4-chlor-2-nitraniline in the form of a mixed halide of a heavy metal, and at least one of the group consisting of sulfamic acid and its salts, as a stabilizing agent therefor.

4. A diazo composition comprising diazotized 4-chlor-2-nitraniline in the form of the diazonium chloride in combination with a heavy metal chloride, and at least one of the group consisting of sulfamic acid and its salts, as a stabilizing agent therefor.

5. A diazo composition comprising diazotized 4-chlor-2-nitraniline and sulfamic acid as a stabilizing agent therefor.

6. A diazo composition comprising a diazo derivative of 4-chlor-2-nitraniline and sulfamic acid in an amount corresponding with one-eighth to three-fourths of the weight of the 4-chlor-2-nitraniline equivalent of the diazo derivative.

7. A dry solid diazo composition comprising diazotized 4-chlor-2-nitraniline in the form of a diazonium halide in combination with zinc halide, and at least one of the group consisting of sulfamic acid and its salts, in an amount equivalent to the weight of sulfamic acid corresponding with one-eighth to three-fourths of the weight of the 4-chlor-2-nitraniline equivalent of the diazonium halide.

8. A dry solid diazo composition comprising diazotized 4-chlor-2-nitraniline in the form of a mixed chloride of zinc, and sulfamic acid in an amount corresponding with about one-half of the weight of the 4-chlor-2-nitraniline equivalent of the mixed chloride.

9. An aqueous printing composition comprising diazotized 4-chlor-2-nitraniline and at least one of the group consisting of sulfamic acid and its salts, as a stabilizing agent therefor.

10. A dry solid diazo composition comprising a diazotized 4-chlor-2-nitraniline and at least one of the group consisting of sulfamic acid and its salts, as a stabilizing agent therefor.

11. A dry solid diazo composition comprising a diazotized 4-chlor-2-nitraniline and sulfamic acid as a stabilizing agent therefor.

EARL W. CLARK.